US012571671B2

(12) United States Patent (10) Patent No.: US 12,571,671 B2

Isler et al. (45) Date of Patent: Mar. 10, 2026

(54) METHOD AND SYSTEM FOR BREATHER HEALTH ASSESSMENT FOR A TRANSFORMER BREATHER

(71) Applicant: Hitachi Energy Ltd, Zürich (CH)

(72) Inventors: Stephane Isler, Faucigny (FR); Christophe Benz, Collex (CH)

(73) Assignee: Hitachi Energy Ltd, Zürich (CH)

( * ) Notice: Subject to any disclaimer, the term of this patent is extended or adjusted under 35 U.S.C. 154(b) by 388 days.

(21) Appl. No.: 17/917,971

(22) PCT Filed: May 3, 2021

(86) PCT No.: PCT/EP2021/061560

§ 371 (c)(1),
(2) Date: Oct. 10, 2022

(87) PCT Pub. No.: WO2021/224176

PCT Pub. Date: Nov. 11, 2021

(65) Prior Publication Data

US 2023/0131583 A1 Apr. 27, 2023

(30) Foreign Application Priority Data

May 4, 2020 (EP) ..................................... 20172781

(51) Int. Cl.
*G01G 19/414* (2006.01)
*H01F 27/02* (2006.01)
(Continued)

(52) U.S. Cl.
CPC ........... *G01G 19/414* (2013.01); *H01F 27/02* (2013.01); *H01F 27/321* (2013.01); *H01F 27/402* (2013.01)

(58) Field of Classification Search
CPC ..... G01G 19/414; H01F 27/02; H01F 27/321; H01F 27/402; H01F 2027/404; H01F 27/14
See application file for complete search history.

(56) References Cited

U.S. PATENT DOCUMENTS

| | | | |
|---|---|---|---|
| 9,026,374 B2 | 5/2015 | Andersson et al. | |
| 2019/0212058 A1* | 7/2019 | Lin | ........................ F26B 21/083 |
| 2023/0347670 A1* | 11/2023 | Lee | ..................... B41J 2/04566 |

FOREIGN PATENT DOCUMENTS

| | | |
|---|---|---|
| CN | 105974974 A | 9/2016 |
| CN | 107491123 A | 12/2017 |

(Continued)

OTHER PUBLICATIONS

Extended European Search Report, European Patent Application No. 20172781.5, mailed Oct. 29, 2020, 13 pages.

(Continued)

*Primary Examiner* — Stephen D Meier
*Assistant Examiner* — Leo T Hinze
(74) *Attorney, Agent, or Firm* — Sage Patent Group

(57) ABSTRACT

Techniques for assessing a health of a transformer breather are provided. The transformer breather contains a desiccant and is in fluid communication with an expansion tank of a fluid-insulated transformer. A weight measurement that is dependent on a weight of the transformer breather or of a component or sub-assembly thereof is processed 7 assess the health of the transformer breather.

20 Claims, 6 Drawing Sheets

(51) Int. Cl.
    H01F 27/32     (2006.01)
    H01F 27/40     (2006.01)

(56)             References Cited

FOREIGN PATENT DOCUMENTS

| | | | |
|---|---|---|---|
| CN | 206772747 | U | 12/2017 |
| CN | 108873997 | A | 11/2018 |
| CN | 109087786 | A | 12/2018 |
| DE | 102018207847 | A1 | 11/2019 |
| EP | 3608930 | A1 | 2/2020 |
| JP | 2004-25476 | A | 1/2004 |
| JP | 2008-118039 | A | 5/2008 |
| JP | 2010-85299 | A | 4/2010 |
| JP | 2011-35303 | A | 2/2011 |
| JP | 2013-77723 | A | 4/2013 |
| JP | 2013-188659 | A | 9/2013 |
| JP | 2020-503689 | A | 1/2020 |
| JP | 2020-95090 | A | 6/2020 |

OTHER PUBLICATIONS

International Search Report and Written Opinion of the International Searching Authority, PCT/EP2021/061560, mailed Jul. 26, 2021, 13 pages.

Office Action, Japanese Patent Application No. 2022-567168, mailed Oct. 25, 2023, 2 pages.

Office Action, Chinese Patent Application No. 202180031333.9, mailed Mar. 1, 2025, 14 pages.

\* cited by examiner

METHOD AND SYSTEM FOR BREATHER HEALTH ASSESSMENT FOR A TRANSFORMER BREATHER

CROSS REFERENCE TO RELATED APPLICATIONS

This application is a 35 U.S.C. § 371 national stage application of PCT International Application No. PCT/EP2021/061560 filed on May 3, 2021, which in turn claims foreign priority to European Patent Application No. 20172781.5, filed on May 4, 2020, the disclosures and content of which are incorporated by reference herein in their entirety.

FIELD OF THE INVENTION

The invention relates to transformer breathers and, more particularly, to techniques for assessing the health of a transformer breather.

BACKGROUND OF THE INVENTION

Fluid-insulated transformers, such as oil-insulated transformers, need an apparatus to compensate the additional volume of the insulating fluid resulting from the fluid expansion and contraction under fluctuating temperature. An expansion tank is fluidly connected to the transformer tank of the fluid-insulated transformer to accommodate the expansion of the insulation fluid. While reference will mainly be made to oil as an insulation fluid, it will be appreciated that the techniques disclosed herein are also applicable to other insulation fluids.

The expansion tank is designed so that the oil level is at the bottom of the expansion tank at minimum rated temperature while the oil level is at the top of the expansion tank at the maximum rated temperature, with reasonable margins. The expansion tank therefore contains a mix of oil and air, and is the place where components contained in the air can move into the oil and vice versa.

It may be important to avoid or minimize the presence of humidity (i.e., water) in the insulating fluid, as such humidity may have a negative impact on the capability of a dielectric to withstand voltage and accelerates degrading chemical reactions such as oxidation. Therefore, it is also required to avoid or minimize humidity in the air present in the expansion tank.

U.S. Pat. No. 9,026,374B2 appears to describe a technique for determining a relative humidity of an insulating liquid filled electric apparatus, that uses a sensor provided in a tank containing insulation liquid and gas.

In order to minimize the amount of humidity present in the air in the expansion tank, an air breather is used as an accessory device. The air breather has an air inlet in contact with the outside world and an outlet in contact with the expansion tank, and some drying elements (also referred to as desiccant) in its interior.

The desiccant has a limited absorption capability. Once the desiccant is saturated with water, it is no longer possible for the desiccant to extract humidity from the air. Therefore, in order to ensure that the air breather is always fully operational, the desiccant must be replaced.

If the desiccant is replaced in regular pre-determined intervals, the maintenance work may not adequately take into account the varying operating conditions under which the transformer, expansion tank, and air breather can operate. Conservative estimates for maintenance intervals may result in the desiccant to be replaced earlier than required in many cases, whereas longer maintenance intervals may be associated with the risk of an increase of air humidity in the expansion tank and, thus, an increased risk of causing damage to the transformer.

A chemical component can be added to the desiccant which reacts with humidity so as to cause a color change as an indication of the saturation of the desiccant elements. The planned maintenance then consists in doing a visual inspection of the breather at regular intervals, which may vary from a few days to a month. When and only when the color indicates that a certain fraction of the desiccant elements is saturated, the air breather is emptied and refilled with new desiccant elements. Other architectures of air breathers exist. For illustration, the desiccant may be contained in a cartridge within the air breather, and the cartridge as a whole can be replaced when the need arises.

Various shortcomings are associated with a maintenance that relies on color change of the desiccant and visual inspection:

It is often hard to have access to the breather to inspect the color of the desiccant elements, which has impact on the cost of the visual inspection and/or on the quality of the inspection. This applies in particular when the transformer is a traction transformer, where inspection must be scheduled in accordance with the operation schedule of the vehicle on which the traction transformer is installed. The challenges to reliably detect whether the desiccant elements must be replaced may be exacerbated when the breather can be covered by dust and/or when it is located in a place that can be difficult to access, as may be the case for a traction transformer on a train.

Color change does not provide a clear objective decision and leaves room for some interpretation by maintenance staff performing the inspection Different decisions may be made subjectively depending on who is making the visual inspection. This applies in particular when less experienced personnel are deployed to perform the visual inspection.

Drying elements obtained from different manufacturers may also use different colors for indicating whether the desiccant elements are still working properly or whether they must be exchanged. This increases the risk of mistakes being made during visual inspection.

These various shortcomings may result in two different scenarios, each of which is problematic:

When the breather health is still good but the maintenance personnel making the visual inspection takes the decision to replace the desiccant elements, resources are wasted, and operating costs are increased.

When the breather health is no longer satisfying, but the maintenance personnel making the visual inspection takes the decision not to replace the desiccant elements and wait for next visual inspection, this might result in oil contamination with water. This in turn can reduce the dielectric strength of the insulation oil and can lead to faster ageing. Such faster ageing can be brought about through oxidation of the insulation oil, without being limited thereto. This adversely affects the operation safety of the transformer.

A Self Dehydrating Breather (SDB) contains heating elements able to regenerate the desiccant elements. Regeneration can be triggered by a timer or based on a breather health estimates. However, SDBs are costly and it is not always attractive to use SDBs. Moreover, SDBs are typically bigger than conventional breathers which do not contain heating elements for regeneration. The increased construction space may be a problem for small transformers, such as traction transformers for which the space is very constrained.

U.S. 2019/0212058 A1 and CN 108 873 997 A disclose power transformer moisture absorbers. The systems of U.S. 2019/0212058 A1 and CN 108 873 997 A process weight measurements to determine when regeneration is to be triggered by heating a desiccant material.

EP 3 608 930 A1 and DE 10 2018 207 847 A1 disclose traction transformers. The systems of EP 3 608 930 A1 and DE 10 2018 207 847 A1 use air humidity sensors to computationally determine the amount of water in a desiccant material. The techniques can be used to schedule maintenance.

SUMMARY

There is a need to provide improved techniques for assessing breather health of a transformer breather. There is in particular a need for techniques that mitigate the problems associated with relying on a visual inspection of a color change desiccant for assessing the breather health. There is a need for methods and systems that allow the breather health to be determined automatically and objectively.

According to embodiments of the invention, weight measurements are processed to assess a breather health. The weight measurements are dependent on a weight of a transformer breather or of a sub-assembly or component of the transformer breather that includes the desiccant. Assessing the breather health may include determining whether the desiccant needs to be exchanged. Assessing the breather health may alternatively or additionally include predicting a maintenance time at which the desiccant needs to be exchanged.

The weight measurement may represent or may be dependent on any one of the following, without being limited thereto:

a gravity force acting on the transformer breather;
a gravity force acting on a component or a sub-assembly of the transformer breather that includes the desiccant;
a force exerted by the transformer breather onto another constructional element, such as a support for the transformer breather, which is dependent on a gravity force acting on the transformer breather;
a force exerted by a component or a sub-assembly of the transformer breather that includes the desiccant on another constructional element (such as a housing in which a cartridge containing the desiccant is mounted), which is dependent on a gravity force acting on a component or a sub-assembly of the transformer breather that includes the desiccant;
a change in any one of the above quantities that occurs over time.

As used herein, the term "weight measurement" in particular encompasses gravity force and mass or changes in gravity force or mass.

The "weight measurement" may be in the form of data or signals.

The weight measurements may, but do not need to be indicative of the actual gravity force or mass of the transformer breather, the desiccant, or a component or sub-assembly containing the desiccant. The techniques disclosed herein can be employed using various types of weight measurements that provide information on the weight of the desiccant or a change in weight of the desiccant.

Various data may be processed in addition to the weight measurements. For illustration, information on an air temperature, relative humidity of air, and a volume flow rate of air entering the transformer breather may be used to assess the health of the transformer breather. The air temperature and relative humidity of the air may be obtained by sensor readings or may be retrieved via the internet. The volume flow rate may be measured using a pressure drop measurements arrangement or a flowmeter or may be determined by processing an oil temperature of the insulation oil in the transformer tank.

Alarms, warnings, or other output signals may be output based on a result of a determination whether the desiccant needs to be exchanged and/or based on the estimated maintenance time at which the desiccant needs to be exchanged.

According to an embodiment, a method of performing a breather health assessment for a transformer breather is provided. The transformer breather contains a desiccant and is in fluid communication with an expansion tank of a fluid-insulated transformer, in particular of an oil-insulated transformer. The method comprises receiving a weight measurement, the weight measurement being dependent on a weight of the transformer breather or of a sub-assembly or component of the transformer breather that includes the desiccant, and processing the weight measurement to assess a breather health of the transformer breather.

As noted above, the weight measurement may take various forms and may be provided by, e.g., weight or mass sensor readings. The weight measurement may include time-sequentially captured sensor readings that are compared to each other for assessing the breather health, or may operate by comparing a single sensor reading to a threshold, for example.

Processing the weight measurement may comprise determining whether the desiccant must be exchanged.

Processing the weight measurement may comprise computing a maintenance time at which the desiccant must be exchanged.

The maintenance time may be computed based on an evolution of the weight as a function of time. The weight measurement may include time-sequentially captured sensor readings that allow the evolution to be determined.

The maintenance time may be computed as a function of a gas flow rate into the transformer breather.

The gas entering the transformer breather may be air entering from an ambient environment.

The ambient environment may be the earth's atmosphere or an inside of an enclosure (such as a cabinet or a shell of a movable platform) in which an intake of the transformer breather is housed.

The method may further comprise retrieving a transformer oil temperature and determining the gas flow rate as a function of the transformer oil temperature.

The method may comprise estimating a density of the oil in the expansion tank based on the transformer oil temperature in the transformer tank, and using the density to determine the gas flow rate.

The method may further comprise retrieving a transformer oil temperature in the expansion tank and determining the gas flow rate as a function of the transformer oil temperature in the expansion tank.

The method may further comprise computing a forecast gas flow rate based on the gas flow rate in the past and using the forecast gas flow rate to compute the maintenance time.

A machine learning algorithm may be executed for computing the maintenance time.

The method may comprise training the machine learning algorithm prior to operation of the transformer.

The method may comprise training the machine learning algorithm during operation of the transformer.

The maintenance time may be further computed as a function of a gas temperature of gas entering the transformer breather from an ambient environment and at least one of relative humidity of the gas entering the transformer breather or water content in the oil of the transformer.

The method may further comprise computing a forecast gas temperature of the gas entering the transformer breather based on the gas temperature in the past and using the forecast gas temperature to compute the maintenance time.

The method may further comprise computing a forecast relative humidity of the gas entering the transformer breather based on the gas temperature in the past and using the forecast relative humidity to compute the maintenance time.

The method may further comprise retrieving the gas temperature and the relative humidity via a wide area network (WAN), in particular via the internet.

The method may comprise sensing a geographic location of the transformer and retrieving the gas temperature and the relative humidity based on the sensed geographic location.

The method may further comprise receiving a user-specified alert interval and selectively generating output based on the computed maintenance time and the user-specified alert interval.

The transformer may be installed on a moving support, in particular on a vehicle. The transformer may be a traction transformer.

The method may further comprise determining whether the transformer is moving. Determining whether the transformer is moving may be based on time-dependent changes of location data (which may be sensed using a GPS sensor or other position sensor) and/or acceleration data captured using an acceleration sensor and/or velocity data and/or an output of an inertial measurement unit (IMU).

The method may further comprise actuating a mechanical lock for a weight sensor that provides the weight measurement when the transformer is moving or the transformer breather is experiencing vibrations.

The method may further comprise discarding weight measurements captured while the transformer is moving or the transformer breather is experiencing vibrations.

The method may further comprise obtaining weight measurements selectively only when the transformer is not moving or the transformer breather is not experiencing vibrations.

The weight measurement may be processed remotely from the transformer.

The weight measurement may be processed in a cloud-based computing infrastructure.

The weight measurement may be retrieved via a gateway or other data aggregator.

Data that indicates whether the transformer is moving or the transformer breather is experiencing vibrations and/or data that allows the gas flow rate to be determined may be retrieved via a gateway or other data aggregator.

The desiccant may include or consist of silica.

The transformer breather may be a passive element that is free from components requiring power supply. The transformer breather may not include any heating elements for regeneration of the desiccant.

According to another embodiment, a system for performing a breather health assessment for a transformer breather is provided, wherein the transformer breather contains a desiccant and is in fluid communication with an expansion tank of a fluid-insulated transformer, in particular an oil-insulated transformer. The system comprises an interface adapted to receive a weight measurement, the weight measurement being dependent on a weight of the transformer breather or of a sub-assembly or component of the transformer breather that includes the desiccant. The system comprises at least one integrated circuit adapted to process the weight measurement to assess a breather health of the transformer breather.

The system may comprise a weight sensor operatively coupled to the transformer breather or a sub-assembly or component thereof for capturing the weight measurement. As noted above, the weight measurement may take a variety of different forms and may include the measurement of a gravity force or mass, without being limited thereto.

The system may be adapted to perform the method of any one of the embodiments disclosed herein.

The at least one integrated circuit may be adapted to process the weight measurement to determine whether the desiccant must be exchanged.

The at least one integrated circuit may be adapted to process the weight measurement to compute a maintenance time at which the desiccant must be exchanged.

The at least one integrated circuit may be adapted to compute the maintenance time based on an evolution of the weight as a function of time. The weight measurements may include time-sequentially captured sensor readings that allow the evolution to be determined.

The at least one integrated circuit may be adapted to compute the maintenance time as a function of a gas flow rate into the transformer breather. The gas entering the transformer breather may be air from an ambient environment.

The ambient environment may be the earth's atmosphere or an inside of an enclosure (such as a cabinet or a shell of a movable platform) in which the transformer breather is housed.

The system may be adapted to retrieve a transformer oil temperature. The at least one integrated circuit may be adapted to determine the gas flow rate as a function of the transformer oil temperature.

The at least one integrated circuit may be adapted to compute a forecast gas flow rate based on the gas flow rate in the past and using the forecast gas flow rate to compute the maintenance time.

The at least one integrated circuit may be adapted to execute a machine learning algorithm for computing the maintenance time.

The machine learning algorithm may be trained prior to operation of the transformer.

The at least one integrated circuit may be adapted to train the machine learning algorithm during operation of the transformer.

The at least one integrated circuit may be adapted to compute the maintenance time as a function of a gas temperature of gas entering the transformer breather from an ambient environment and at least one of relative humidity of the gas entering the transformer breather or water content in the oil of the transformer.

The system may be adapted to retrieve the gas temperature and the relative humidity via a WAN, in particular via the internet.

The system may be adapted to retrieve a sensed geographic location of the transformer and to retrieve the gas temperature and the relative humidity based on the sensed geographic location.

The system may be adapted to receive a user-specified alert interval and to selectively generate output based on the computed maintenance time and the user-specified alert interval.

The transformer may be installed on a moving support, in particular on a vehicle. The transformer may be a traction transformer.

The system may be adapted to determine whether the transformer is moving. The system may be adapted to determine whether the transformer is moving based on time-dependent changes of location data (which may be sensed using a GPS sensor or other position sensor) and/or acceleration data captured using an acceleration sensor and/or velocity data and/or an output of an inertial measurement unit (IMU).

The system may be adapted to issue a command to actuate a mechanical lock for the weight sensor when the transformer is moving.

The at least one integrated circuit may be adapted to discard weight measurements captured while the transformer is moving.

The at least one integrated circuit may be adapted to obtain weight measurements selectively only when the transformer is not moving.

The system may be arranged remotely from the transformer.

The system may be a cloud-based computing infrastructure.

The system may receive weight measurements and, optionally, data that indicates whether the transformer is moving and/or data that allows the gas flow rate to be determined via a gateway.

The desiccant may include or consist of silica.

The transformer breather may be a passive element that is free from components requiring power supply. The transformer breather may not include any heating elements for regeneration of the desiccant.

A transformer system according to an embodiment comprises an oil-insulated transformer having a transformer tank, an expansion tank in fluid communication with the transformer tank, a transformer breather containing a desiccant, the transformer breather being in fluid communication with the expansion tank, a sensor adapted to provide the weight measurement, and the system for performing a breather health assessment that is communicatively coupled to the weight sensor and adapted to process the weight measurement to assess a breather health of the transformer breather.

The transformer may be a traction transformer.

The transformer, expansion tank, and transformer breather may be installed on a moving platform, in particular on a vehicle. The vehicle may be a train.

The moving platform may include a location sensor and/or an acceleration sensor and/or a velocity sensor and/or an inertial measurement unit (IMU). The sensor may be on the transformer or its accessories (e.g., the expansion tank and/or breather), but may be located elsewhere on the moving platform. For illustration, a location sensor and/or acceleration sensor may be installed in a control stand of a train on which the traction transformer, expansion tank, and breather are mounted. The sensor output(s) of such sensor(s) that are provided at any rate for control purposes may be used in the techniques for transformer breather health assessment disclosed herein.

The sensor(s) that provide the signals or data may include sensor(s) that are pre-installed on the transformer and/or sensor(s) that are pre-installed on the movable platform. For illustration, sensor(s) that are (also) used for different control or monitoring purposes on the transformer and/or the movable platform may additionally be used for performing the breather health assessment.

The system for performing the breather health assessment may be adapted to receive location data captured using the location sensor and/or acceleration data captured using the acceleration sensor and to use the location and/or acceleration data when performing breather health assessment.

The transformer may include an oil temperature sensor.

The system for performing the breather health assessment may be adapted to receive oil temperature data captured using the oil temperature sensor, to use the oil temperature data to derive a gas flow rate into the transformer breather, and to use the derived gas flow rate for performing breather health assessment.

The oil temperature data may be indicative of an oil temperature in the transformer tank or of an oil temperature in the expansion tank. When the oil temperature data is indicative of the oil temperature in the transformer tank, the system may be adapted to estimate an oil temperature in the expansion tank based on the oil temperature in the transformer tank.

The system may be adapted to estimate a density of the oil in the expansion tank based on the oil temperature data and use the estimated density to derive the gas flow rate. The gas entering the transformer breather may be ambient air.

The ambient environment may be the earth's atmosphere or an inside of an enclosure (such as a cabinet or a shell of a movable platform) in which the transformer breather is housed.

The insulation fluid may be insulation oil.

According to another embodiment, a movable platform is disclosed that comprises the transformer system according to an embodiment.

The movable platform may be a train or locomotive.

The train or locomotive may have a machine that is connected to an output of the transformer.

The train may have an electric locomotive propelled by the machine or a diesel electric locomotive propelled by the machine.

Various effects are attained by the methods and systems according to embodiments. The methods and system allow the transformer breather health to be assessed in a quantitative, objective manner, thereby mitigating the problems associated with relying on a visual inspection of a color change desiccant for assessing the breather health.

When a gas flow rate is computed to forecast a future evolution of the transformer breather health, and/or when information on air temperature and relative humidity of air entering the transformer breather are retrieved from a database via the internet or WAN, the techniques disclosed herein can be implemented in a particularly efficient manner, requiring little additional sensor equipment to be mounted.

When information on the movement of a moveable platform is taken into account to which the transformer, expansion tank, and transformer breather are mounted, the risk of the weight measurements being inaccurate may be reduced, thereby providing a reliable health assessment even for transformer breathers used in association with traction transformers.

While embodiments of the invention may be used for oil-insulated traction transformers, they are not limited thereto.

BRIEF DESCRIPTION OF THE DRAWINGS

The subject-matter of the invention will be explained in more detail with reference to preferred example embodiments which are illustrated in the attached drawings, in which.

DETAILED DESCRIPTION OF EMBODIMENTS

Figures 1, 2:
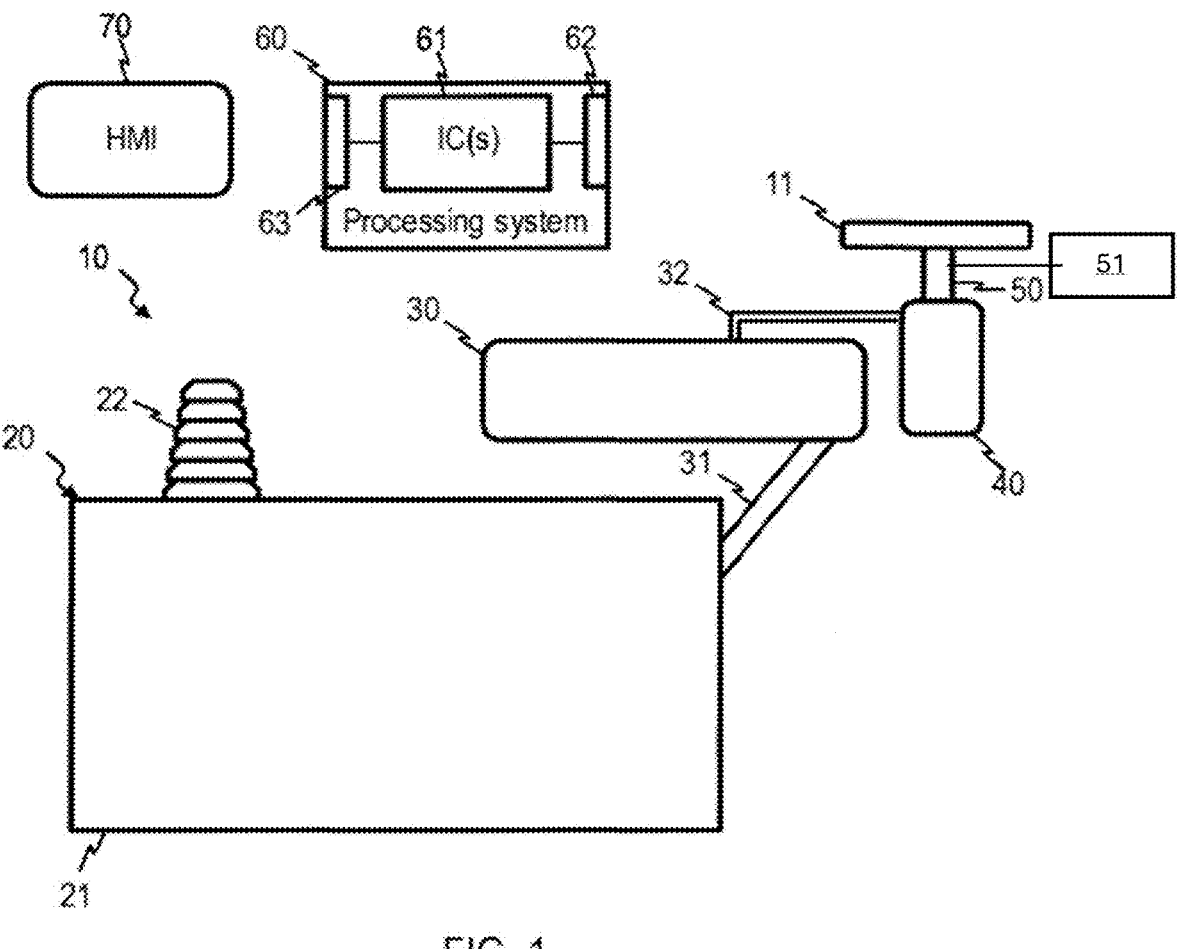
FIG. 1 is a schematic view of a transformer system according to an embodiment.
FIG. 2 is a graph illustrating operation of a system according to an embodiment.

Example embodiments of the invention will be described with reference to the drawings in which identical or similar reference signs designate identical or similar elements. While some embodiments will be described in the context of an oil-insulated traction transformer, the embodiments are not limited thereto. The features of embodiments may be combined with each other, unless specifically noted otherwise.

According to embodiments of the invention, a weight sensor may be inserted between a transformer breather and a fixation point, in order to obtain a quantitative and reliable measurement indicative of a saturation of desiccant in the transformer breather. The fixation point may be on the expansion tank, with the weight sensor being inserted between the expansion tank and the transformer breather. The transformer breather may also be mechanically supported on main transformer tank, a vehicle (e.g., a train) or another support, and the weight sensor may be inserted between the transformer breather and its fixation point. In yet other variants, a force sensor may be used that does not need to measure the gravity force of the whole transformer breather, but which may be arranged to measure a force (gravity force or inertial force) acting on a sub-assembly or component of the transformer breather that comprises at least a fraction of the desiccant.

As previously noted, the "weight measurement" that is processed in embodiments of the invention may take any one of a variety of forms, including, without limitation:

a gravity force acting on the transformer breather;

a gravity force acting on a component or a sub-assembly of the transformer breather that includes the desiccant;

a force exerted by the transformer breather onto another constructional element, such as a support for the transformer breather, which is dependent on a gravity force acting on the transformer breather;

a force exerted by a component or a sub-assembly of the transformer breather that includes the desiccant on another constructional element (such as a housing in which a cartridge containing the desiccant is mounted), which is dependent on a gravity force acting on a component or a sub-assembly of the transformer breather that includes the desiccant;

a change in any one of the above quantities that occurs over time.

As used herein, the term "weight measurement" in particular encompasses gravity force and mass.

Thus, the weight measurement may be captured using a variety of different sensor types. For simplicity, these sensors will be referred to as "weight sensor" herein.

Decisions on maintenance can be taken based on objective, clear criteria and in an automatic manner, without having to rely upon a subjective interpretation of a color of color change desiccants.

The difficulties associated with a visual inspection of a transformer breather are eliminated. The weight sensor can be read electronically. For illustration, the weight sensor can be connected to a data aggregator making the information available to a remote processing system. However, the processing disclosed herein may also be performed locally, without requiring transmission of weight sensor readings to a remote processing device. For illustration, one or several integrated circuit(s) installed on board a moving platform (e.g., a train) may perform the processing operations disclosed herein and may selectively issue a warning, alert, or other signal based on the performed breather health assessment.

Typical desiccant elements in a transformer breather of a traction transformer have a weight that may be several hundreds of grams or that may exceed 1 kg and may be on the order of several kilograms. A relative weight difference between non-saturated and saturated states of the desiccant is on the order of several tens of percent of %. Thus, weight measurements can be performed with sufficient accuracy using inexpensive sensors, such as strain gauges or other known sensors.

FIG. 1 is a schematic view of a transformer system 10 according to an embodiment. The transformer system 10 comprises an oil-insulated transformer 20, an expansion tank 30, a transformer breather 40, a weight sensor 50, a mechanical lock 51 for the weight sensor, and a processing system 60 adapted to perform a breather health assessment for the transformer breather 40.

The transformer 20 has a transformer tank 21 which may contain insulation oil or another insulation fluid. The transformer 20 includes various conventional transformer components, such as an active part and bushings 22.

The interior volume of the transformer tank 21 is in fluid communication with an expansion tank 30 via at least one oil conduit 31. The expansion tank 30 is designed so that the oil level is at the bottom of the expansion tank 30 at minimum rated temperature while the oil level is at the top of the expansion tank 30 at the maximum rated temperature, with reasonable margins. The expansion tank 30 therefore contains a mix of oil and air.

The expansion tank 30 is in fluid communication with the transformer breather 40 via at least one air conduit 32. The transformer breather 40 has an interior volume containing a desiccant. The desiccant may include or may consist of silica, without being limited thereto. The desiccant may be contained in a cartridge that may be removably provided in a shell of the transformer breather 40. The transformer breather 40 may be a passive component that has zero power consumption in use. The transformer breather 40 may be implemented in such a manner that it does not contain any active elements for regeneration of the desiccant. The transformer breather 40 may be operative to remove water (be it in gaseous form or in the form of small droplets) that may be entrained in the air entering the transformer breather 40 before the air flows to the expansion tank 30 via the air conduit 32, when the desiccant has not yet reached saturation.

The transformer breather 40 may be mounted to a support 11. The support 11 may be integral with the expansion tank 30. The transformer breather 40 may be suspended on the expansion tank 30. The weight sensor 50 may be interposed between the transformer breather 40 and its support. Other arrangements of supporting the transformer breather 40 may be used.

Other arrangements may be used. For illustration, the support 11 may be integral with the transformer tank 21, a vehicle (e.g., a train) or another support, and the weight sensor may be inserted between the transformer breather and its fixation point. In yet other variants, a force sensor may be used that is interposed between a cartridge containing the desiccant and a shell of the transformer breather.

The processing system 60 is generally operative to process data or a signal that is indicative of or otherwise dependent on a weight of the transformer breather 40. This information will be referred to as weight measurement herein. The weight measurement may include or may be time-series information indicating the weight of the transformer breather 40 (or of a sub-assembly or component that includes the desiccant) as a function of time. The time-series data that is processed does not need to be captured or sampled in regular intervals. For illustration, if the transformer 20 is a traction transformer, the weight measurement processed by the processing system 60 to assess the breather health may include or may consist of those data that are captured while the output of the weight sensor 50 is deemed to be reliable. For illustration, the processing system 60 may selectively process weight measurements including the weight data captured by the weight sensor 50 while the transformer 20, expansion tank 30, and transformer breather 40 were at rest or while the transformer breather 40 was not experiencing vibrations. The weight measurement may represent a gravity force or mass, without being limited thereto. The weight measurement may be in the form of data or signals.

The processing system 60 is generally operative to assess the transformer breather health of the transformer breather 40. As used herein, assessing the transformer breather health may include or may consist of determining whether, and optionally forecasting when, the desiccant in the transformer breather 40 approaches or reaches a state of saturation.

The processing system 60 may optionally process information other than the weight measurements to perform the transformer breather health assessment. Example information that may be processed includes any one or any combination of the following:

Information on movement of the transformer breather 40; this information may include information on whether the transformer breather 40 is moving (which may be used for determining whether weight data are to be regarded as reliable, without being limited thereto) and/or information on a geographic location of the transformer breather 40 (which may be used for retrieving air temperature and/or air relative humidity (RH) data for prognostic breather health assessment and/or for identifying patterns of recurring movement that may be used to train a machine learning (ML) model used for prognostic breather health assessment). This information may be captured using a location sensor, such as a GPS sensor, and/or using an acceleration sensor.

Information on an air temperature and/or air RH of air entering the transformer breather 40 from an ambient environment. This information may be used for prognostic breather health assessment, in particular for forecasting future saturation of the desiccant. This information may be captured using a temperature sensor and/or air humidity sensor that may be installed at or close to the air breather (e.g., on a vehicle on which the transformer 20 is mounted). This information may alternatively be retrieved from a database, e.g. a weather database, via the internet or another wide area network (WAN).

Information on a flow rate at which ambient air enters the transformer breather 40. This information may be based on a flowmeter measurement or a pressure drop measurements arrangement or may be computed using a transformer model based on, e.g., a sensed oil temperature of the transformer oil. This information may be used for prognostic breather health assessment, in particular for forecasting future saturation of the desiccant.

The processing system 60 may retrieve the data captured with one or several sensors via a gateway. The processing system 60 may be provided remotely from the transformer breather 40, e.g., in a cloud-computing system. The processing system 60 has an interface 62 for receiving the sensor data.

The processing system 60 may have a further interface 63 for providing output to, e.g., a human-machine interface (HMI) 70 or for issuing a command to automatically trigger a control action.

The HMI 70 may be located in proximity to the processing system 60, but may also be provided remotely from the processing system 60. The HMI 70 and processing system 60 may be communicatively connected via the internet or another WAN. The HMI can be implemented on a cloud or a software that is executed remotely from the processing system 60.

The processing system 60 has at least one integrated circuit (IC) 61, which may be implemented by one or several application specific integrated circuits (ASIC), one or several controllers, one or several processors, or any combination thereof. The processing system 60 may be implemented as a distributed processing system, with several ICs being distributed over an extended area. The at least one IC performs the processing operations that will be described in more detail with reference to FIGS. 2 to 11.

FIG. 2 is a graph illustrating a weight 81 indicating the evolution of the weight of the transformer breather 40 or of the sub-assembly or component containing the desiccant, including the weight of the desiccant contained therein. The weight 81 is a monotonously increasing function and may be received by the processing system 60 intermittently as time-series data.

The processing system 60 may be operative to perform a transformer breather health assessment by determining whether the weight 81 of the transformer breather has reached a threshold 82 indicating that the desiccant is close to, but not yet at the point of being saturated. The threshold 82 may be set in a transformer breather specific manner, depending on the amount of desiccant contained in the respective transformer breather, and its saturation characteristics.

The processing system 60 and, optionally, the HMI 70 may be adapted to receive a user input specifying the threshold 82. In this case, the processing system 60 may provide data to the HMI 70 indicating a recommend value for the threshold 82 and may receive a user input specifying the threshold 82 that is to be used. Alternatively or additionally, the threshold 82 may be determined by the processing system 60 in an automatic or semi-automatic manner. Information on, e.g., the type of transformer, the type of expansion tank (in particular expansion tank volume, without being limited thereto), and/or the type of transformer breather (in particular initial weight of the desiccant, type of desiccant used, and/or volume of the transformer breather, without being limited thereto) may be used by the processing system 60 to suggest or determine the threshold 82. The required information for suggesting or setting the threshold 82 may be based on user input received by the HMI 70, configuration data stored in a database, and/or other information sources.

The processing system 60 may cause an output, such as a warning, alert, or other information indicating that the desiccant is approaching saturation when determining that the weight measurement 81 has reached the threshold 82. It will be appreciated that the threshold 82 is normally selected such that it is lower than the weight corresponding to desiccant saturation.

The processing system 60 may be adapted to not only determine whether the weight that has already been measured indicates that the desiccant in the transformer breather 40 approaches saturation and requires maintenance, but to also perform a prognostic transformer breather health assessment. The prognostic transformer breather health assessment may involve forecasting a future evolution of the weight (which is a measure for desiccant saturation). The prognostic transformer breather health assessment may include computationally forecasting a time at which the weight is expected to reach a threshold level.

Figure 3:
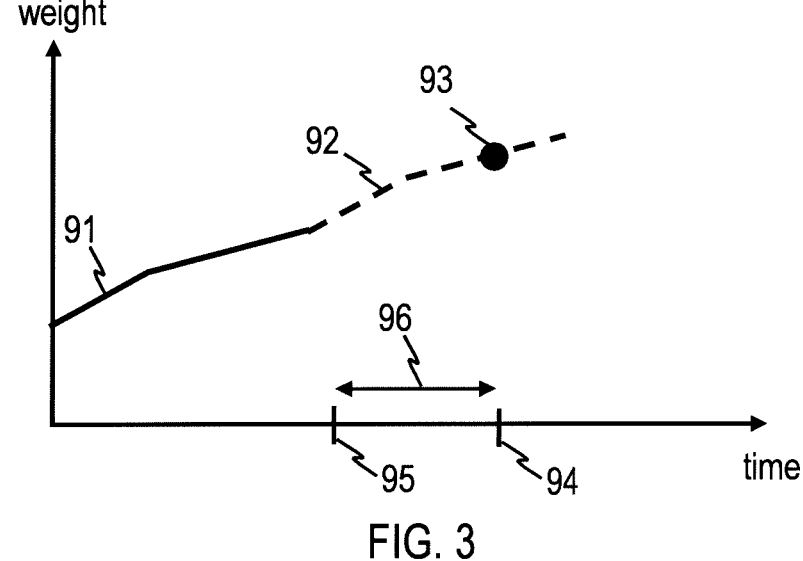
FIG. 3 is a graph illustrating operation of a system according to an embodiment.

FIG. 3 is a graph illustrating a weight 91 measured in the past, indicating the evolution of the weight of the transformer breather 40 (or of the sub-assembly or component containing the desiccant) in the past, including the weight of the desiccant contained therein. Based on the weight evolution 91 and optional other data (which will be described in more detail below), the processing system 60 can compute a forecasted evolution 92 of the weight for times later than the time at which the most recent weight data has been captured. The processing system 60 can compute a time 94 at which the forecasted weight evolution 92 reaches a level 93 at which the desiccant must be exchanged.

The processing system 60 may be adapted to update the forecasted evolution 92 and/or a model that is used to compute the forecasted evolution 92 as new weight measurements become available. For illustration, a machine learning model may be updated based on a comparison of the forecasted evolution 92 and actual weight measurement as new weight data samples become available.

The processing system 60 may be adapted to selectively cause outputting of a warning, alarm, or other signal at a signal output time 95. The signal output time 95 precedes the forecasted time 94 at which the desiccant must be exchanged by a period 96. The period 96 may be a user-defined period, which can be set via the HMI 70. In this way, user-configurable alarms, warnings, or other outputs may be generated, depending on the time desired by the operator of the transformer 20 for an advance notice before an actual human maintenance action is required at the site of the transformer 20.

A prognostic transformer breather health assessment may be implemented in various ways, as will be explained in more detail with reference to FIGS. 4 to 9. The processing system 60 may be adapted to inform and warn operators in advance before the desiccant must be exchanged. This can be done by combining the knowledge of the quantity of air flowing through the transformer breather 40 as well as information concerning this air (temperature and RH), using a model linking these data to the saturation of the desiccant. It will be appreciated that such a model relating air characteristics and air flow rate to the saturation of the desiccant is known in the art and is used, e.g., for transformer design.

Figure 4:
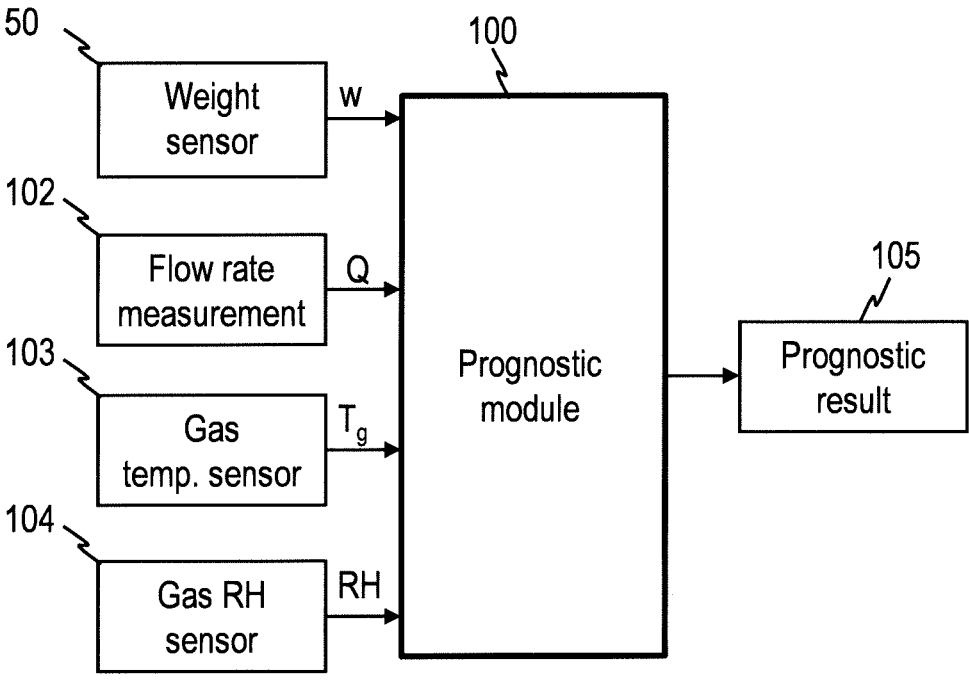
FIG. 4 is a schematic view of a system according to an embodiment.

FIG. 4 illustrates operation of a prognostic module 100. The prognostic module 100 may be executed by the IC(s) 61 of the processing system 60 to determine in advance when the desiccant saturation is expected to reach saturation.

The prognostic module 100 receives a weight signal w from the weight sensor 50. The prognostic module 100 receives a flow rate Q of ambient air into the transformer breather 40. The ambient air may be air entering from the earth's atmosphere, but may also be air entering from within an enclosure in which the intake of the transformer breather 40 is arranged.

The flow rate Q may be determined or derived from flow rate measurements or pressure drop measurements. While a flowmeter or pressure drop measurement arrangement may be used to perform the flow rate measurement, the flow rate Q is computationally derived from other sensor data, as will be explained in more detail below. The flow rate Q is a historical flow rate from the past, which may be extrapolated into the future to forecast the future evolution of the transformer breather weight from the last weight measurement w. The evolution of the weight is indicative of the desiccant saturation.

The prognostic module 100 may receive an input from a location sensor and/or acceleration sensor and/or velocity sensor and/or an inertial measurement unit (IMU), as will be described in more detail below.

The prognostic module 100 receives a gas temperature $T_g$ of the ambient air entering the transformer breather 40. The gas temperature $T_g$ may be captured using a temperature sensor or may be retrieved from a weather database. If temperature sensor readings are used, extrapolation and/or combination with historical data may be employed to forecast the evolution of the gas temperature $T_g$ in the future. If weather databases are accessed, historical data indicative of a characteristics evolution of the gas temperature $T_g$ as a function of time of day and/or date are available.

The prognostic module 100 receives a gas RH of the ambient air entering the transformer breather 40. The gas RH may be captured using an air humidity sensor or may be retrieved from a weather database. If air humidity sensor readings are used, extrapolation and/or combination with historical data may be employed to forecast the evolution of the gas RH in the future. If weather databases are accessed, historical data indicative of a characteristics evolution of the gas temperature RH as a function of time of day and/or date are available.

If sensors are used for capturing the gas temperature $T_g$ and/or gas RH, the sensors may be sensors installed on the transformer, expansion tank or a movable platform for other purposes. For illustration, the output of a thermometer and/or hygrometer mounted on or integrated into a train on which the transformer breather 40 may be used.

The prognostic module 100 may input the flow rate Q, the gas temperature $T_g$, and the gas RH as forecast for a future time horizon into a model. The model may be an empirical model that reflects the change of desiccant weight as a function of the flow rate Q, the gas temperature $T_g$, and the gas RH. As noted above, such models are known to the skilled person and are used for transformer design processes.

The prognostic module 100 may compute and output a prognostic result 105. The prognostic result 105 may depend on a forecasted time 94 at which the weight evolution of the transformer breather 40, as forecasted by the prognostic module 100, is expected to reach a weight threshold. The prognostic result 105 may depend on a user-specified notification period 96, as has been explained with reference to FIG. 3.

As was noted above, it is possible, but not inevitable to determine the flow rate Q using a flow meter or a pressure drop measurement. In order to avoid the costs and space required for an additional flow meter or pressure drop measurement arrangement, the flow rate Q may be computationally derived. Sensor data of sensors that are at any rate present in the transformer 20 or expansion tank 30 may be used for computing the flow rate Q.

For illustration, a good estimation of the air quantity flowing through the transformer breather 40 can be made using existing oil sensors (such as a Pt100 transformer oil sensor), which can also be connected to a data aggregator. The temperature measured by this oil temperature sensor is characteristic for the average oil temperature. Thus, the prognostic module 100 can derive from the oil temperature which volume of oil is present in the expansion tank 30 at any point in time and then derive the air flow by analyzing the variation of this volume over time. The exact amount of the oil volume is not required, and estimation techniques can be used.

For illustration, oil temperature data indicative of the oil temperature in the expansion tank may be used to compute (using, e.g., look-up tables or closed equations) the density of oil in the expansion tank. The density may in turn be used for computing the gas flow rate.

Alternatively or additionally, oil temperature data indicative of the oil temperature in the transformer tank may be used. The oil temperature in the transformer tank may be used as a reasonable approximation for the oil temperature in the expansion tank and, thus, may be used to compute (using, e.g., look-up tables or closed equations) the density of oil in the expansion tank. The density may in turn be used for computing the gas flow rate.

While the oil temperature in the expansion tank can be smaller than the oil temperature in the main transformer tank, an estimation of the oil density can be computed which is accurate enough for the functionality described herein.

Figure 5:
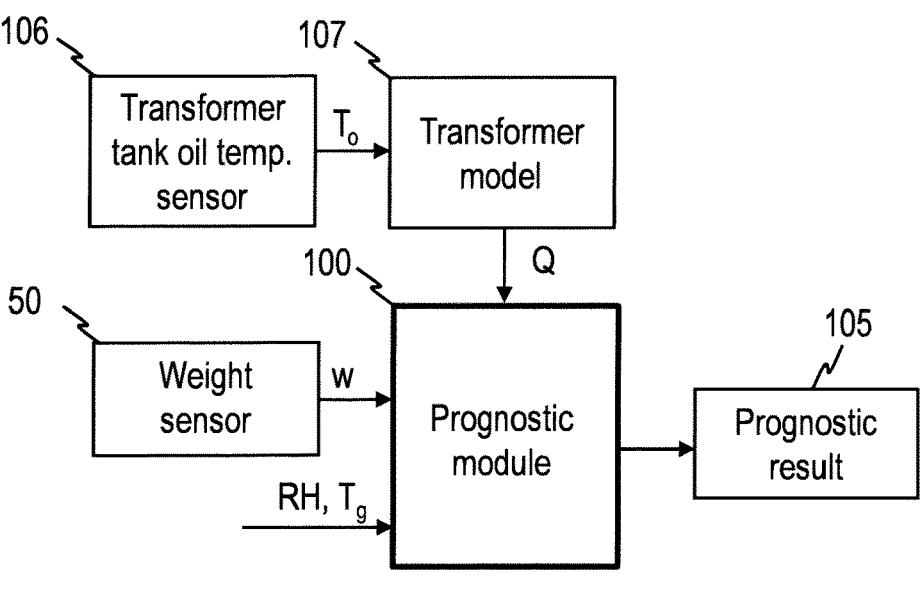
FIG. 5 is a schematic view of a system according to an embodiment.

FIG. 5 illustrates an embodiment in which a sensor 106 measuring an oil temperature of the transformer insulation oil provides an oil temperature $T_o$. The oil temperature $T_o$ is processed, using a transformer model 107 for example, to computationally derive the air flow rate Q. The air flow rate Q is then further processed by the prognostic module, in combination with the gas temperature $T_g$ and the gas RH to forecast the future evolution of the desiccant saturation process, as has been explained with reference to FIG. 4.

Figure 6:
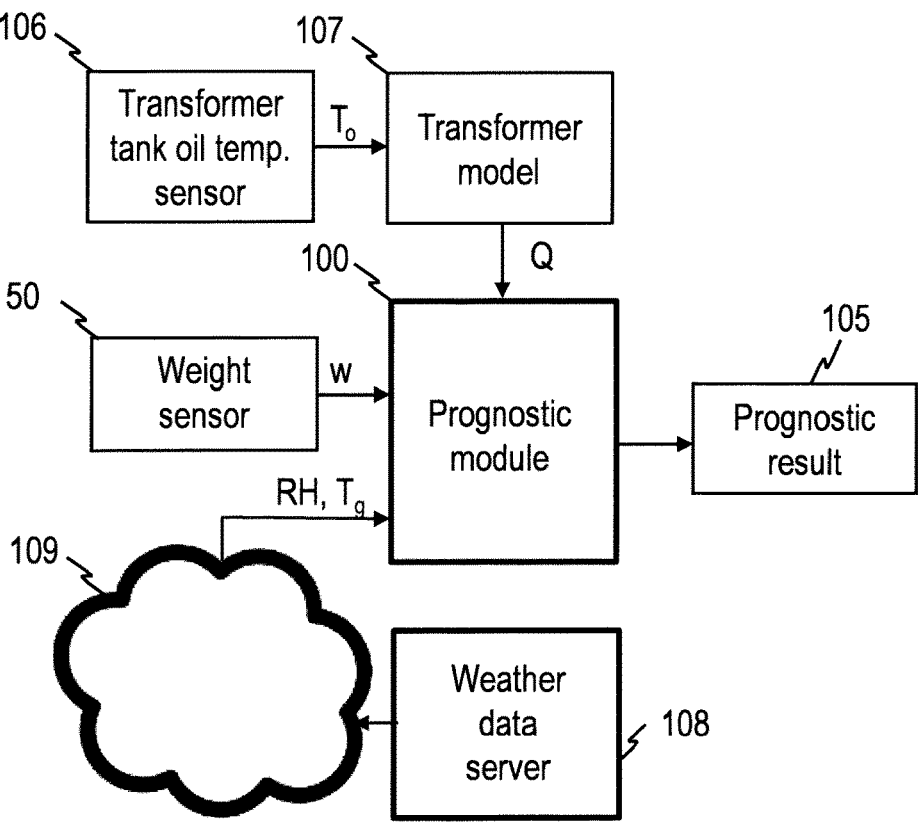
FIG. 6 is schematic view of a system according to an embodiment.

The temperature and RH of the ambient air entering into the transformer breather 40 may be captured using sensors, but can also be determined based on weather data from the internet, as shown in FIG. 6.

FIG. 6 illustrates an embodiment in which the prognostic module 100 accesses weather data 108 via the internet 109 to determine the temperature and RH of the ambient that are used to forecast the future evolution of the desiccant saturation.

Depending on the type of vehicle on which the traction transformer 20 is installed, the location for which the weather data needs to be determined can be fixed (as may be the case for a dedicated airport shuttle, short distance regional train etc.). Alternatively, the location used for retrieving the weather data from which the gas temperature $T_g$ and the gas RH are determined can be based on a GPS or other location sensor for longer distance trains and train which are allocated to different routes through the year.

The change in desiccant weight due to saturation is a slow chemical process that takes place over weeks or months. Thus, weather data does not need to be reliable for one day, but the invention takes advantage of the ability for instance to forecast the average temperature during a given month in a given place, and similarly for the average RH. Statistical information on temperature/humidity month by month is already widely available and can be used by the prognostic module 100.

The estimated air flow Q in the coming days or weeks can be based on a moving average or other statistical measures, more advanced techniques can be used. For illustration, machine learning may be employed, as will be explained in more detail with reference to FIG. 9.

Figure 7:
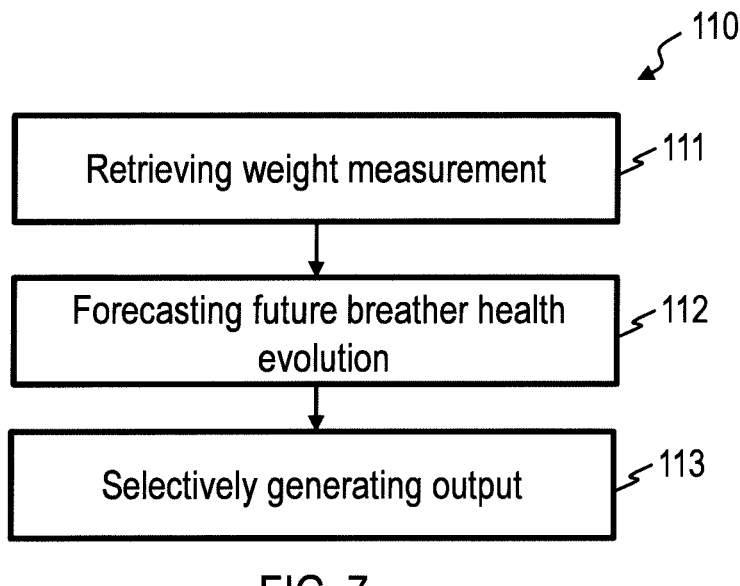
FIG. 7 is a flow chart of a method according to an embodiment.

FIG. 7 is a flow chart of a method 110 according to an embodiment. The method 110 may be performed automatically by the processing system 60.

At operation 111, a weight measurement is retrieved. The weight measurement may be retrieved from the weight sensor 60 via a gateway or other data aggregator.

At operation 112, the future breather health evolution is forecast. This may involve forecasting the future evolution in transformer breather weight and, thus, the evolution of the degree to which desiccant saturation is taking place.

At operation 113, an output (such as an alarm, warning, or other signal) may be selectively output based on the predicted future breather health evolution. The time at which the output is generated and/or the type of output may be dependent on a forecasted time 94 at which the weight evolution of the transformer breather 40 is expected to reach a weight threshold, and/or on a user-specified notification period 96, as has been explained with reference to FIG. 3.

Figure 8:
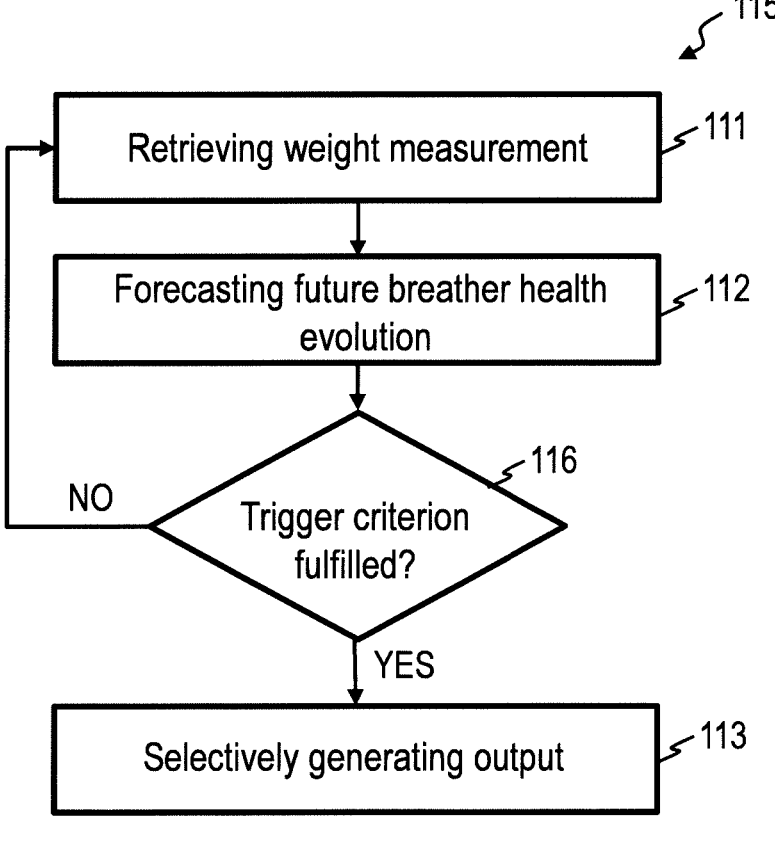
FIG. 8 is a flow chart of a method according to an embodiment.

FIG. 8 is a flow chart of a method 115 according to an embodiment. The method 115 may be performed automatically by the processing system 60.

Operations 111 and 112 may be implemented as explained with reference to FIG. 7.

At operation 116, it is determined whether a trigger criterion for generating an output is fulfilled. The trigger criterion may be based on a comparison of the transformer breather weight to a threshold. The trigger criterion may be based on comparing a time difference between a forecasted time 94 at which the weight evolution of the transformer breather 40 is expected to reach a weight threshold and the current time to a threshold. If the difference is less than the threshold, the output may be generated. The threshold may be a user-specified threshold that indicates how much advance notice is desired by the user.

At operation 113, the output (such as an alarm, warning, or other signal) is output if the trigger criterion is fulfilled.

Figure 9:
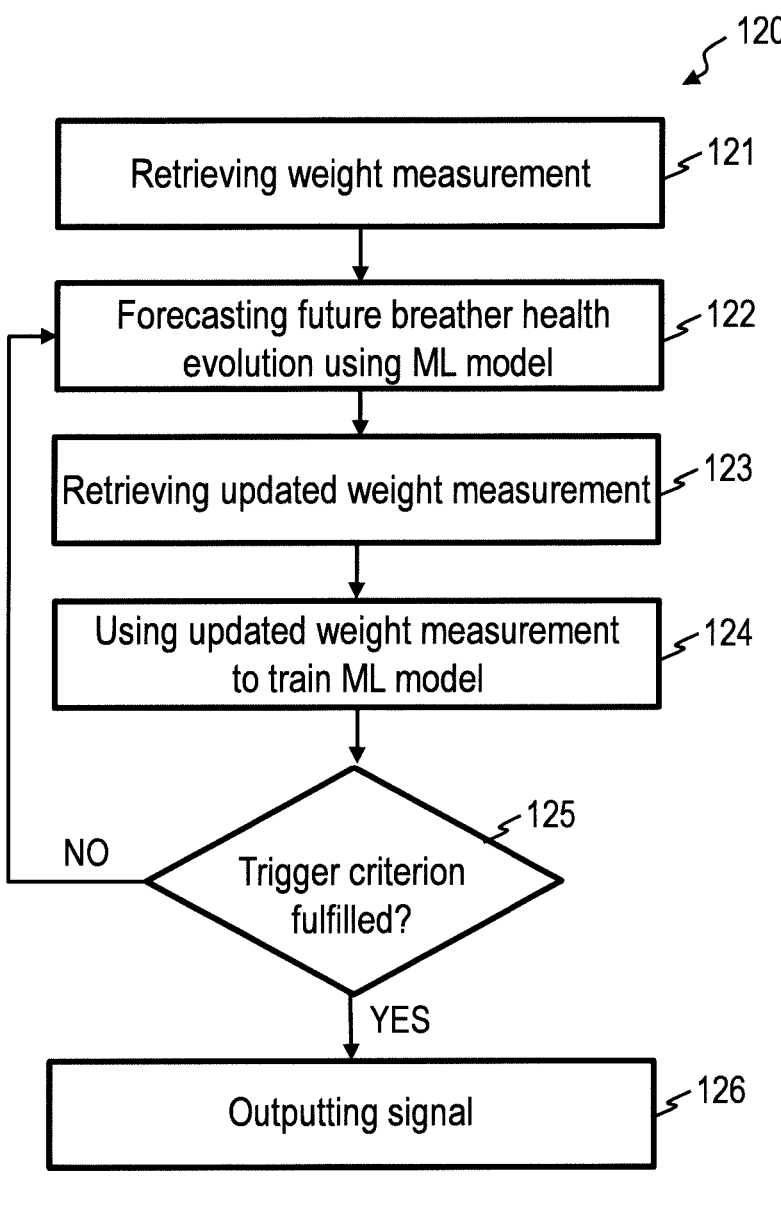
FIG. 9 is a flow chart of a method according to an embodiment.

FIG. 9 is a flow chart of a method 120 according to an embodiment. The method 120 may be performed automatically by the processing system 60.

At operation 121, a weight measurement is retrieved. The weight measurement may be retrieved from the weight sensor 60 via a gateway or other data aggregator.

At operation 122, the future breather health evolution is forecast using a machine learning (ML) model. This may involve forecasting the future evolution in transformer breather weight and, thus, the evolution of the degree to which desiccant saturation is taking place based on the ML model.

At operation 123, an updated weight measurement is retrieved. The updated weight measurement may include plural weight data samples taken at different times.

At operation 124, the updated weight measurement is used to train the ML model. For illustration, parameters of the ML model may be adjusted based on the updated weight measurement.

At operation 125, it is determined whether a trigger criterion for generating an output is fulfilled. The trigger criterion may be based on a comparison of the transformer breather weight to a threshold. The trigger criterion may be based on comparing a time difference between a forecasted time 94 at which the weight evolution of the transformer breather 40 is expected to reach a weight threshold and the current time to a threshold. If the difference is less than the threshold, the output may be generated. The threshold may be a user-specified threshold that indicates how much advance notice is desired by the user. If the trigger criterion is not fulfilled, the method may return to operation 122.

At operation 126, the output (such as an alarm, warning, or other signal) is output if the trigger criterion is fulfilled.

Figure 10:
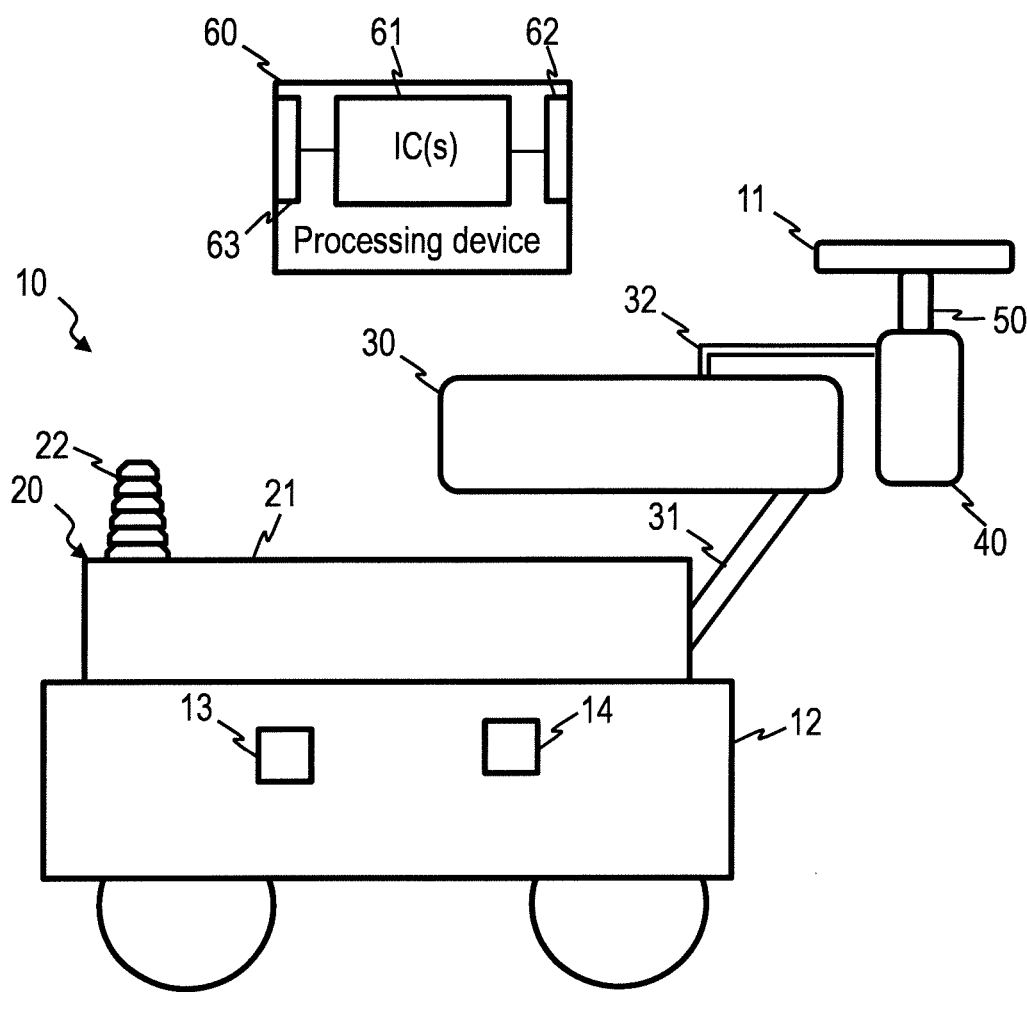
FIG. 10 is a schematic view of a transformer system according to an embodiment.
Figure 11:
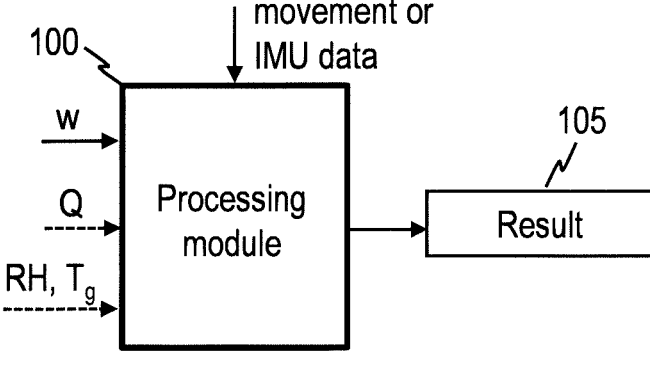
FIG. 11 is schematic view of a system according to an embodiment.

FIGS. 10 and 11 show embodiments in which a transformer breather is used in association with expansion tanks of traction transformers. For transformer breathers used in association with expansion tanks of traction transformers, information on the movement of the transformer breather 40 (which is substantially identical to the movement of the transformer 20 and the expansion tank 30) may be processed by the processing system 60. For illustration, a location sensor 13 (such as a GPS sensor), an acceleration sensor 14, an inertial measurement unit such as an inertia central 14, or a velocity sensor (which may be integrated within the train in which the transformer 20 is mounted) can be used to detect when a train 12 on which the transformer 20, expansion tank 30, and transformer breather 40 are mounted does not move and/or to detect when the transformer breather 40 is not experiencing vibrations.

The sensor(s) 13, 14 that provide information on when the transformer breather 40 is moving or when the transformer breather 40 is experiencing vibrations may include sensor(s) that are pre-installed on the transformer and/or sensor(s) that are pre-installed on the movable platform, such as a train. For illustration, sensor(s) that are (also) used for different control or monitoring purposes on the transformer and/or the movable platform may additionally be used for identifying time intervals in which the transformer breather 40 is moving or when the transformer breather 40 is experiencing vibrations.

FIG. 11 is a schematic block diagram. The processing module of any one of the above-described embodiments may be enhanced in such a way that it receives signals or data that indicate whether or in which time period(s) the transformer breather 40 is moving and/or is experiencing vibrations.

The information provided by location or movement sensors or by an IMU may be used by the processing module 100 in various ways, including, without limitation, any one or any combination of the following:

Determining whether weight data are to be regarded as reliable and/or controlling the capture and/or processing of weight measurement. This may include any one or any combination of the following, without limitation:

issuing a command to cause actuation of a mechanical lock for the weight sensor while the transformer breather is moving and/or while the transformer breather is experiencing vibrations;

discarding weight measurements captured while the transformer breather is moving and/or while the transformer breather is experiencing vibrations;

obtaining weight measurements selectively only when the transformer breather is not moving and/or only when the transformer breather is not experiencing vibrations.

Retrieving air temperature and/or air RH data from the internet for prognostic breather health assessment based on the location.

Identifying patterns of recurring movement that may be used to train a machine learning (ML) model used for prognostic breather health assessment.

For illustration, weight measurements of the transformer breather 40 may be captured only during stop intervals when the measurement is not polluted by shocks and vibrations caused by movement of the train 12.

Various effects and advantages are associated with the invention. The invention provides a quantitative technique for reliably assessing transformer breather health, in particular by determining whether the desiccant approaches a state of saturation in which it must be exchanged. Embodiments of the invention provide additional effects, such as providing a forecast of when to change the desiccant. The amount of required on-site inspection is reduced, without having to rely on the additional costs that may be associated with Self Dehydrating Breather (SDB) solutions.

The methods and systems according to the invention may be used in association with oil-insulated traction transformers, without being limited thereto.

While the invention has been described in detail in the drawings and foregoing description, such description is to be considered illustrative or example and not restrictive. Variations to the disclosed embodiments can be understood and effected by those skilled in the art and practicing the claimed invention, from a study of the drawings, the disclosure, and the appended claims. In the claims, the word "comprising" does not exclude other elements operations or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A method of performing a breather health assessment for a transformer breather, wherein the transformer breather contains a desiccant and is in fluid communication with an expansion tank of a fluid-insulated transformer, in particular of an oil-insulated transformer, the method comprising:

receiving a weight measurement, the weight measurement being dependent on a weight of the transformer breather or of a component or sub-assembly of the transformer breather comprising at least part of the desiccant; and processing the weight measurement to assess the breather health of the transformer breather, wherein the method further comprises determining whether the transformer is moving and/or the transformer breather is experiencing vibrations, and one of:

causing actuation of a mechanical lock for a weight sensor when the transformer is moving or the transformer breather is experiencing vibrations;

discarding the weight measurement captured while the transformer is moving or the transformer breather is experiencing vibrations;

obtaining the weight measurement selectively only when the transformer is not moving or the transformer breather is not experiencing vibrations.

2. The method of claim 1, wherein processing the weight measurement comprises determining whether the desiccant must be exchanged.

3. The method of claim 1, wherein processing the weight measurement comprises computing a maintenance time at which the desiccant must be exchanged.

4. The method of claim 3, wherein the maintenance time is computed based on an evolution of the weight as a function of time.

5. The method of claim 3, wherein the maintenance time is computed as a function of a gas flow rate into the transformer breather.

6. The method of claim 5, further comprising retrieving a transformer oil temperature and determining the gas flow rate as a function of the transformer oil temperature.

7. The method of claim 5, further comprising computing a forecast gas flow rate based on a gas flow rate in the past and using the forecast gas flow rate to compute the maintenance time, optionally wherein a machine learning algorithm is executed for computing the maintenance time.

8. The method of claim 5, wherein the maintenance time is further computed as a function of a gas temperature of gas entering the transformer breather and at least one of relative humidity of the gas entering the transformer breather or water content in the oil of the transformer, optionally wherein the method further comprises computing a forecast gas temperature and a forecast relative humidity of the gas entering the transformer breather and using the forecast gas temperature and the forecast relative humidity to compute the maintenance time, optionally wherein the forecast gas temperature is computed based on a gas temperature in the past and optionally wherein the forecast relative humidity is computed based on a relative humidity in the past.

9. The method of claim 8, further comprising retrieving the gas temperature and the relative humidity via a wide area network, optionally wherein a geographic location of the transformer is used for retrieving the gas temperature and the relative humidity.

10. The method of claim 3, further comprising receiving a user-specified alert interval and selectively generating output based on the computed maintenance time and the user-specified alert interval.

11. The method of claim 1, wherein determining whether the transformer is moving is based on time-dependent changes of location data and/or acceleration data captured using an acceleration sensor and/or velocity data and/or an output of an inertial measurement unit.

12. The method of claim 1, wherein the weight measurement is processed remotely from the transformer, optionally wherein the weight measurement is processed in a cloud-based computing infrastructure.

13. A system for performing a breather health assessment for a transformer breather, wherein the transformer breather contains a desiccant and is in fluid communication with an expansion tank of a fluid-insulated transformer, in particular an oil-insulated transformer, the system comprising:

an interface adapted to receive a weight measurement, the weight measurement being dependent on a weight of the transformer breather or of a component or sub-assembly of the transformer breather comprising at least part of the desiccant; and at least one integrated circuit adapted to process the weight measurement to assess the breather health of the transformer breather;

wherein the system is adapted to determine whether the transformer is moving and/or the transformer breather is experiencing vibrations, and at least one of:

cause actuation of a mechanical lock for a weight sensor when the transformer is moving or the transformer breather is experiencing vibrations;

discard the weight measurement captured while the transformer is moving or the transformer breather is experiencing vibrations;

obtain the weight measurement selectively only when the transformer is not moving or the transformer breather is not experiencing vibrations.

14. The system of claim 13, wherein the system is adapted to perform the method of performing a breather health assessment for a transformer breather, wherein the transformer breather contains a desiccant and is in fluid communication with an expansion tank of a fluid-insulated transformer, in particular of an oil-insulated transformer, the method comprising:

receiving a weight measurement, the weight measurement being dependent on a weight of the transformer breather or of a component or sub-assembly of the transformer breather comprising at least part of the desiccant; and processing the weight measurement to assess the breather health of the transformer breather, wherein the method further comprises determining whether the transformer is moving and/or the transformer breather is experiencing vibrations, and one of:

causing actuation of a mechanical lock for a weight sensor when the transformer is moving or the transformer breather is experiencing vibrations;

discarding the weight measurement captured while the transformer is moving or the transformer breather is experiencing vibrations;

obtaining the weight measurement selectively only when the transformer is not moving or the transformer breather is not experiencing vibrations.

15. A transformer system, comprising:

an oil-insulated transformer having a transformer tank;

an expansion tank in fluid communication with the transformer tank;

a transformer breather containing a desiccant, the transformer breather being in fluid communication with the expansion tank;

a sensor adapted to provide a weight measurement; and the system of claim 13 that is communicatively coupled to the sensor and adapted to process the weight measurement to assess a breather health of the transformer breather.

16. The transformer system of claim 15, wherein processing the weight measurement comprises computing a maintenance time at which the desiccant must be exchanged, and wherein the maintenance time is computed based on an evolution of the weight as a function of time.

17. The transformer system of claim 15, wherein the transformer oil temperature is retrieved retrieving and the gas flow rate is determined as a function of the transformer oil temperature.

18. The transformer system of claim 17, wherein the forecast gas flow rate is computed based on a gas flow rate in the past and using the forecast gas flow rate to compute the maintenance time, optionally wherein a machine learning algorithm is executed for computing the maintenance time.

19. The transformer system of claim 15, wherein it is determined whether the transformer is moving is based on time-dependent changes of location data and/or acceleration data captured using an acceleration sensor and/or velocity data and/or an output of an inertial measurement unit.

20. The transformer system of claim 15, wherein the weight measurement is processed remotely from the transformer, optionally wherein the weight measurement is processed in a cloud-based computing infrastructure.

\* \* \* \* \*